March 4, 1924.
P. M. WESTBROOK
CONNECTING ROD BEARING
Original Filed Sept. 23, 1920
1,486,065
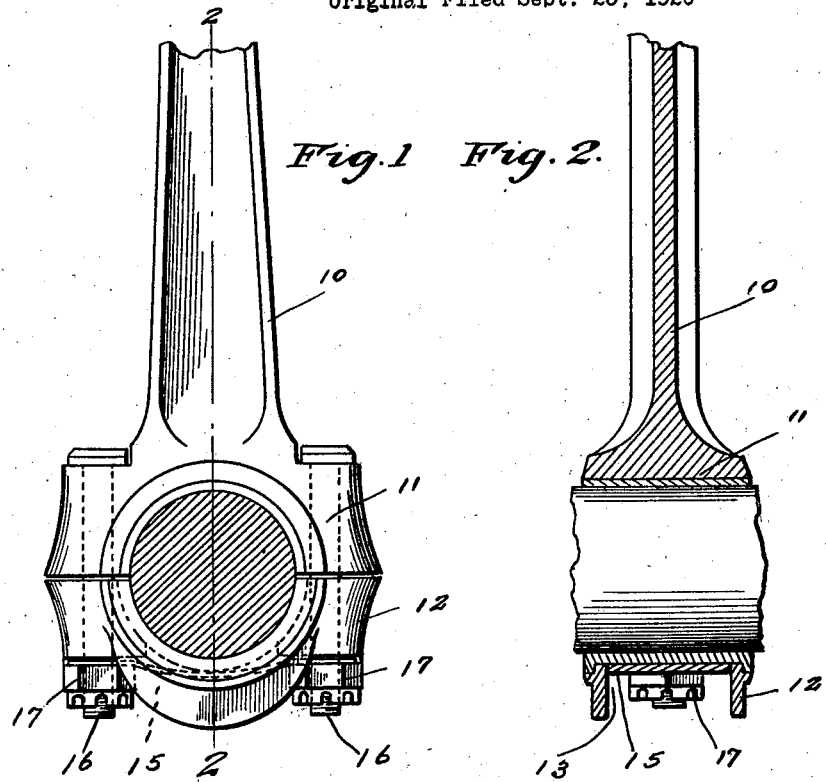
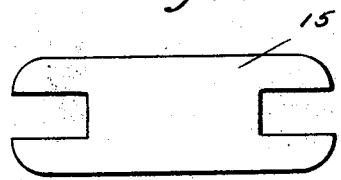
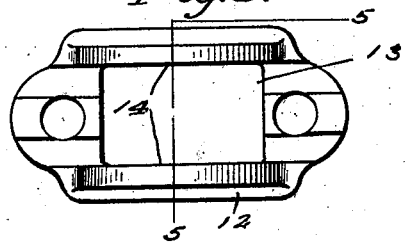
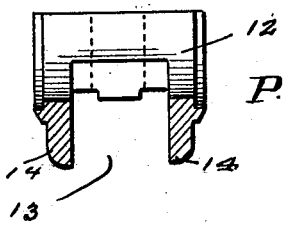
P. M. Westbrook
INVENTOR
BY *Victor J. Evans*
ATTORNEY
WITNESSES Patented Mar. 4, 1924.

1,486,065

UNITED STATES PATENT OFFICE.

PLEASANT M. WESTBROOK, OF ASHLAND, GEORGIA, ASSIGNOR TO GROVER ALEXANDER McFARLAND, OF TOCCOA, GEORGIA, AND ALLEN WATKINS BEDDINGFIELD, OF ATLANTA, GEORGIA.

CONNECTING-ROD BEARING.

Application filed September 23, 1920, Serial No. 412,342. Renewed August 11, 1923.

*To all whom it may concern:*

Be it known that I, PLEASANT M. WESTBROOK, a citizen of the United States, residing at Ashland, in the county of Franklin and State of Georgia, have invented new and useful Improvements in Connecting-Rod Bearings, of which the following is a specification.

This invention relates to connecting rod bearings, and has for its chief characteristic, a novel construction of bearing cap which is designed to be yieldably supported in a manner whereby the cap is automatically adjusted to compensate for wear, thus eliminating lost motion between the connecting rod and the crank shaft of the motor and overcoming what is generally termed knocking of the motor.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a view in elevation of the connecting rod and bearing constructed in accordance with my invention.

Figure 2 is a sectional view taken on line 2—2 of Figure 1.

Figure 3 is a plan view of the bearing cap.

Fig. 4 is a top view of the spring having bifurcated portions.

Fig. 5 is a sectional view taken on line 5—5 of Fig. 3.

Referring to the drawing in detail 10 designates the connecting rod of the usual well-known construction, 11 indicates the upper end portion of the bearing, and 12 the bearing cap. In accordance with my invention, the bearing cap 12 is provided with a groove or recess 13 arranged transversely thereof and defining flanges 14 between which is arranged the spring 15 which is seated in the groove or recess and projects an appreciable distance beyond the sides of the cap 12. The spring 15 is bifurcated at both ends to receive the bolt 16 utilized in holding the cap 12 associated with the upper portion of the bearing 11, the bolts being equipped with nuts 17 which bear against the underside of the spring 16. Manifestly, the bearing 12 is yieldably seated or supported with relation to the upper portion 11 of the bearing, so that the cap 12 is automatically adjusted to compensate for wear and thus eliminating lost motion and increasing the efficiency of the motor as well as overcoming the objectionable knocking of the motor. By adjusting the nuts 17 the tension of the spring can be varied.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A bearing including a stationary bearing member, a movable bearing member, confronting lugs formed on the bearing members, bolts passed through said lugs for connecting the bearing members together, a spring associated with the movable bearing member and having bifurcated portions to receive said bolts whereby the said spring is held in position for use for the purpose specified.

In testimony whereof I affix my signature.

PLEASANT M. $\underset{\text{mark}}{\overset{\text{his}}{\times}}$ WESTBROOK.

Witnesses:
J. D. BRAMLETT,
O. M. COFFEE.